Nov. 16, 1926. 1,607,563
Z. PROKOP
ANIMAL TRAP
Filed April 8, 1926

INVENTOR
Z. Prokop
BY Bryant & Lowry
ATTORNEYS

Patented Nov. 16, 1926.

1,607,563

UNITED STATES PATENT OFFICE.

ZACHARY PROKOP, OF PHILADELPHIA, PENNSYLVANIA.

ANIMAL TRAP.

Application filed April 8, 1926. Serial No. 100,757.

This invention relates to certain new and useful improvements in animal traps.

The primary object of this invention is to provide an animal trap, wherein the animal is caught in a live condition, after which it is destroyed or disposed of in any suitable manner.

A further object of this invention is to provide an animal trap which is easily sprung by the animal upon entering the trap and touching the bait.

A still further object of this invention is to provide an animal trap of a box-like structure having a double wall, one of which is adapted to reinforce the other.

A still further object of this invention is to provide an animal trap which is easy in operation, constructed of comparatively few parts and may be easily manufactured.

With the above and other objects in view that will become apparent as the nature of the invention is better understood, the same consists of the novel form, combination and arrangement of parts hereinafter more fully described, shown in the accompanying drawing and claimed.

Figure 1:
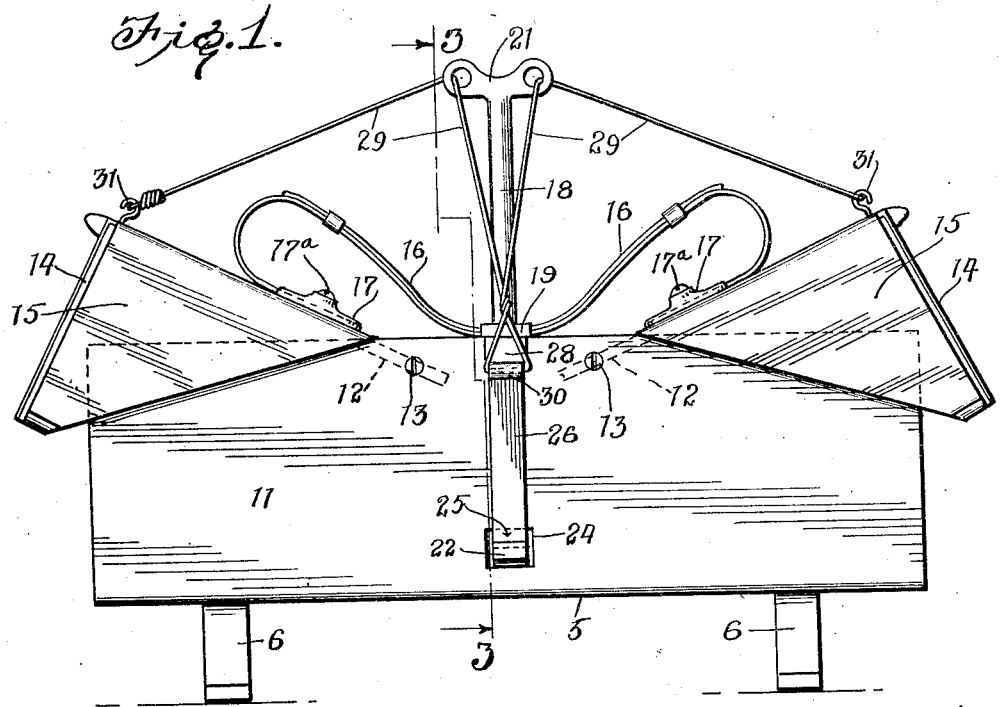
Figure 2:
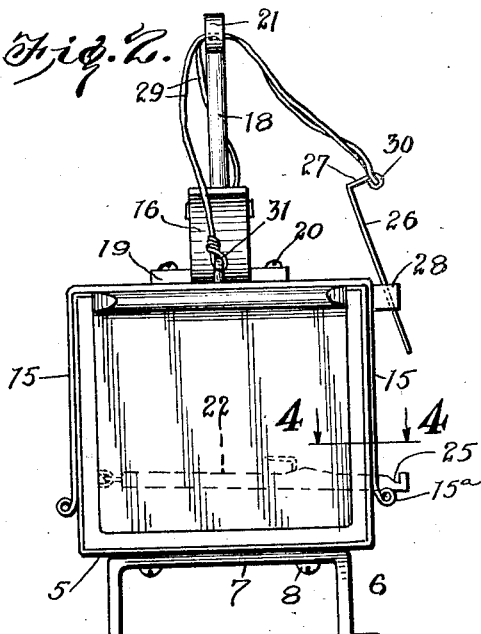
Figure 3:
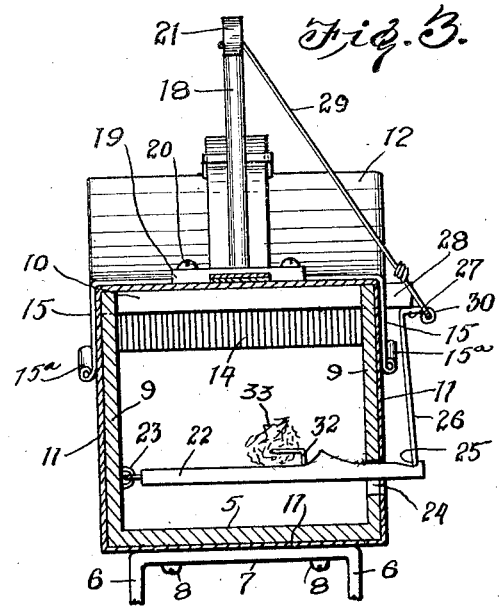
Figure 4:
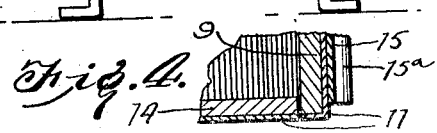

In the drawing, wherein like reference numerals designate corresponding parts throughout the several views, Figure 1 is a side elevational view of an animal trap embodying this invention showing the gates in an open set position and the closing springs flexed, Figure 2 is an end elevation of the same showing the trap in a closed position after being sprung or released, Figure 3 is a central sectional view taken on line 3—3 of Fig. 1 showing the trigger in a set position, Figure 4 is a sectional view taken on line 4—4 of Fig. 2, showing the structure of the gate and side walls of the trap.

Referring more in detail to the accompanying drawings, there is illustrated an animal trap in the form of a box-like structure including a bottom wall 5, supported by suitable legs or standards 6 formed of an inverted U-shaped strip with the connecting portion 7, fastened to the bottom wall 5 of the box-shaped trap by means of screws 8. Opposite side walls 9 are connected at the top by a central bridge 10 leaving the top and end of the structure entirely open. The bottom wall 5, side walls 9, and bridge 10, are covered by a thin wall of sheet metal 11, best shown in Fig. 3, to prevent the animal which may become entrapped therein to escape by gnawing through the wood walls to freedom.

Trap doors or gates are associated with the open ends, and top of the box and are identical in construction, each including a cover 12, hingedly connected to the side walls 9, by means of screws 13, passing therethrough, forming a cover for the top of the box-like structure while angle end portions 14, on the outer ends of the covers 12 form trap doors for the end openings. The cover 12 and ends 14 are covered by a thin wall of sheet metal similar to the covering on the sides 11 and bottom 5. The cover 12 extends downwardly on both sides forming a skirt 15, having its edges rolled as at 15$^a$, which guides the trap door in its downward movement when in operation. A double spring is fastened to the central bridge piece 10, having its arms 16 bent inwardly and fastened to the covers 12, by means of clamping lugs 17, having screws 17$^a$ passing therethrough making a firm connection.

A vertical support 18 having a base portion 19, is fastened to the bridge 10, by means of screws 20, the base portion also serving as a fastener to hold the spring 16 on the bridge 10. The upper portion of the support is provided with a T-head 21, having openings therein to receive the trip cables 29.

The trip mechanism for holding the trap doors in an open set position includes a trip lever 22, centrally fastened to the side wall 9, by a loose pivot 23. The other end extending through an opening 24 in the opposite side wall 9, a notch 25 is formed in the outwardly extending portion of the trip lever 22 which is engaged by a trigger 26, having an angle portion 27, abutting against a stop 28 as shown best in Fig. 3. A double piece of cord 29 is fastened to the loop 30, formed in the upper end of the trigger 26, and passes through the openings in the T-head support 21, the other ends being fastened to the covers 12 by means of suitable eyelets 31.

Any suitable means for baiting the trip lever 22 may be provided, as shown in Fig. 3 wherein an angular wire brad nail 32 is employed and serves the purpose of supporting a piece of bait 33.

For a consideration of the operation of the device, the gates 14 are held in an open set position by cords 29, fastened thereto at one end and fastened to a trip trigger 26 at the other end, the upper portion 27 of the trip trigger 26 abuts against the bridge extension 28, forming a fulcrum for the trigger 26. The lower end of the trigger 26, engages in a notch 25, formed in the outwardly extending end of the trip lever 22, whereupon the slightest displacement of the trip lever 22, by an animal will cause the trigger 26, to be disengaged from the notch 25, and thereby causing the gates 14, to close upon the animal very readily, by the tension of the spring arms 16 on the gates 14.

While the foregoing is descriptive of the preferred embodiment of the invention, obviously minor changes not involving the invention may be made without departing from the spirit and scope of the appended claim.

What I claim is:—

In an animal trap of the class described, a box-like structure having side walls and open at its top and ends, a bridge piece extending between the upper edges of the side walls midway the ends, a trap door for each end comprising an upper wall closing the upper side of the structure and an end wall closing the end thereof, an apron of triangular formation at each side of the trap door disposed in wiping engagement with the outer face of the adjacent side walls and having constant overlapping relations therewith, a single loop spring anchored to the bridge piece and having its ends engaging the trap doors for normally holding the same in lowered closed position, and trip devices associated with the trap doors for holding the same in an open elevated set position against the tension of the spring.

In testimony whereof I affix my signature.

ZACHARY PROKOP.